United States Patent
Schreiber et al.

(10) Patent No.: US 7,216,571 B2
(45) Date of Patent: *May 15, 2007

(54) PROCESS FOR TWIST-FREE STEEL CUTTING OF ROTATIONAL SYMMETRICAL SURFACES

(75) Inventors: Leo Schreiber, Schwäbisch-Gmünd (DE); Adrian Riegel, Göppingen (DE); Matthias Kohlhase, Schramberg-Sulgen (DE)

(73) Assignee: Boehringer Werkzeugmaschinen GmbH, Goppingen (DE)

( * ) Notice: Subject to any disclaimer, the term of this patent is extended or adjusted under 35 U.S.C. 154(b) by 77 days.

This patent is subject to a terminal disclaimer.

(21) Appl. No.: 10/489,435

(22) PCT Filed: Sep. 11, 2002

(86) PCT No.: PCT/EP02/10202
§ 371 (c)(1),
(2), (4) Date: Nov. 9, 2004

(87) PCT Pub. No.: WO03/022497
PCT Pub. Date: Mar. 20, 2003

(65) Prior Publication Data
US 2005/0076754 A1  Apr. 14, 2005

(30) Foreign Application Priority Data
Sep. 11, 2001  (DE) ................. 101 44 649

(51) Int. Cl.
*B23B 1/00*  (2006.01)
(52) U.S. Cl. ............... 82/1.11; 408/18; 407/69
(58) Field of Classification Search ........... 82/1.11, 82/16, 17, 18, 19; 407/67, 69, 118
See application file for complete search history.

(56) References Cited

U.S. PATENT DOCUMENTS
3,878,742 A  4/1975  Lahm
(Continued)

FOREIGN PATENT DOCUMENTS
DE  4119162 C1  6/1991
(Continued)

OTHER PUBLICATIONS
"Interplay of Cutting Methods As A Machining Development Base", Russian Engineering Research, vol. 15, No. 2, pp. 87-92, 1996.

*Primary Examiner*—Monica Carter
*Assistant Examiner*—Sara Addisu
(74) *Attorney, Agent, or Firm*—Head, Johnson & Kachigian

(57) ABSTRACT

The invention relates to the cutting of rotating surfaces, especially centric symmetric surfaces (1a) of a metal workpiece (1), especially one made of steel or gray cast iron, also when said workpiece is in hardened state, by means of a geometrically determined cutter (2a) or cutters, wherein the axial extension and the material of the surface to be machined are hardly limited or not limited at all and/or the operating time during machining is reduced according to said method and/or the service life of the tool is enhanced and/or the effect of the twist-free condition is achieved, wherein at least one cutter (2a) that is skewed relative to the rotational axis (10) of the workpiece is guided during a feeding motion (3,3') in a contacting manner on the rotating workpiece and wherein the machining parameters of the rotational axis, especially the forward feed motion in the direction of feeding and the skewed position (x) of the cutter (2a) relative to the longitudinal direction (z), are chosen in such a way that twisting in terms of the degree of twisting (s) and/or the depth of twisting (t), more particularly the depth of twisting, on the surface being machined is minimized, wherein the forward feed motion includes an axial movement.

15 Claims, 6 Drawing Sheets

U.S. PATENT DOCUMENTS

| | | | | |
|---|---|---|---|---|
| 5,218,893 | A | * | 6/1993 | Shikata ........................ 82/1.11 |
| 5,349,888 | A | * | 9/1994 | Schmid ........................ 82/1.11 |
| 5,373,631 | A | | 12/1994 | Schmid |
| 5,778,745 | A | * | 7/1998 | Furusawa et al. ............ 82/1.11 |
| 6,952,987 | B2 | * | 10/2005 | Schreiber et al. ............ 82/1.11 |
| 2003/0089204 | A1 | | 5/2003 | Schreiber et al. |

FOREIGN PATENT DOCUMENTS

| | | |
|---|---|---|
| DE | 4135681 A1 | 10/1991 |
| DE | 19963897 A1 | 12/1999 |
| DE | 10037974 A1 | 8/2000 |
| EP | 0911099 A1 | 4/1999 |
| EP | 0976484 A2 | 2/2000 |
| JP | 60207701 | 10/1985 |
| JP | 63212401 | 5/1999 |
| SU | 518275 | 3/1975 |
| SU | 703240 | 5/1975 |
| SU | 1263427 | 4/1985 |
| WO | 01/43902 A2 | 6/2001 |

* cited by examiner

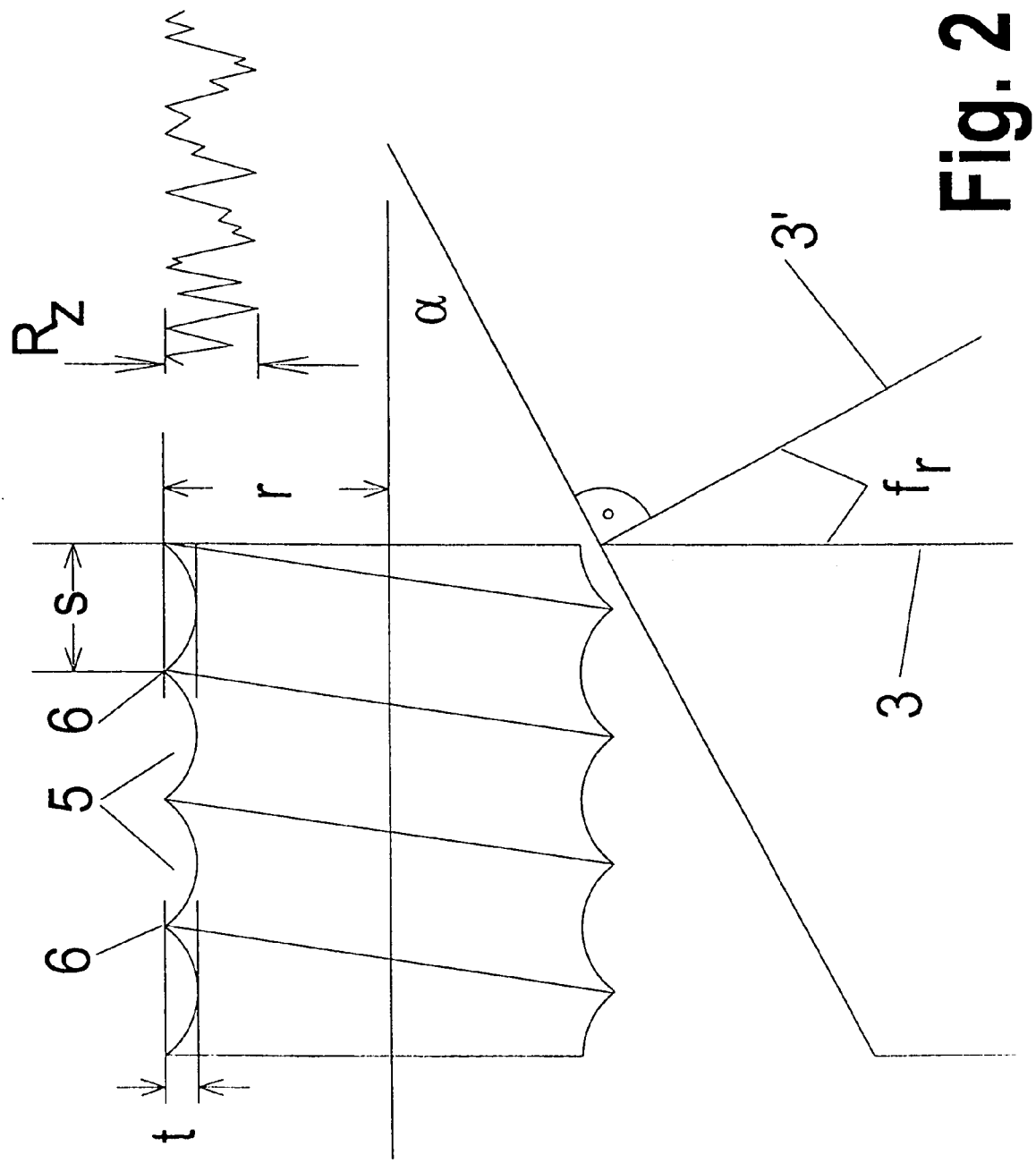

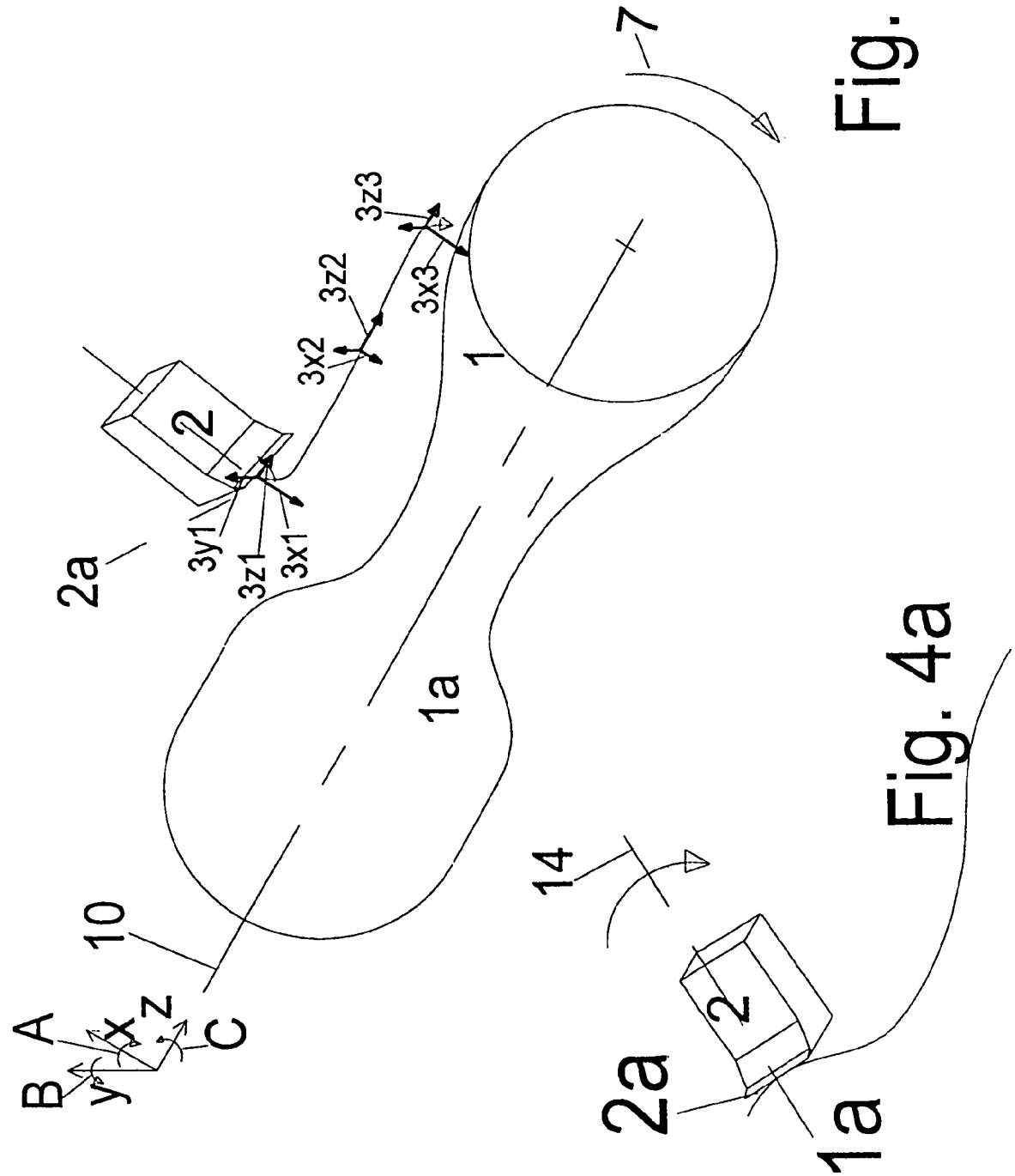

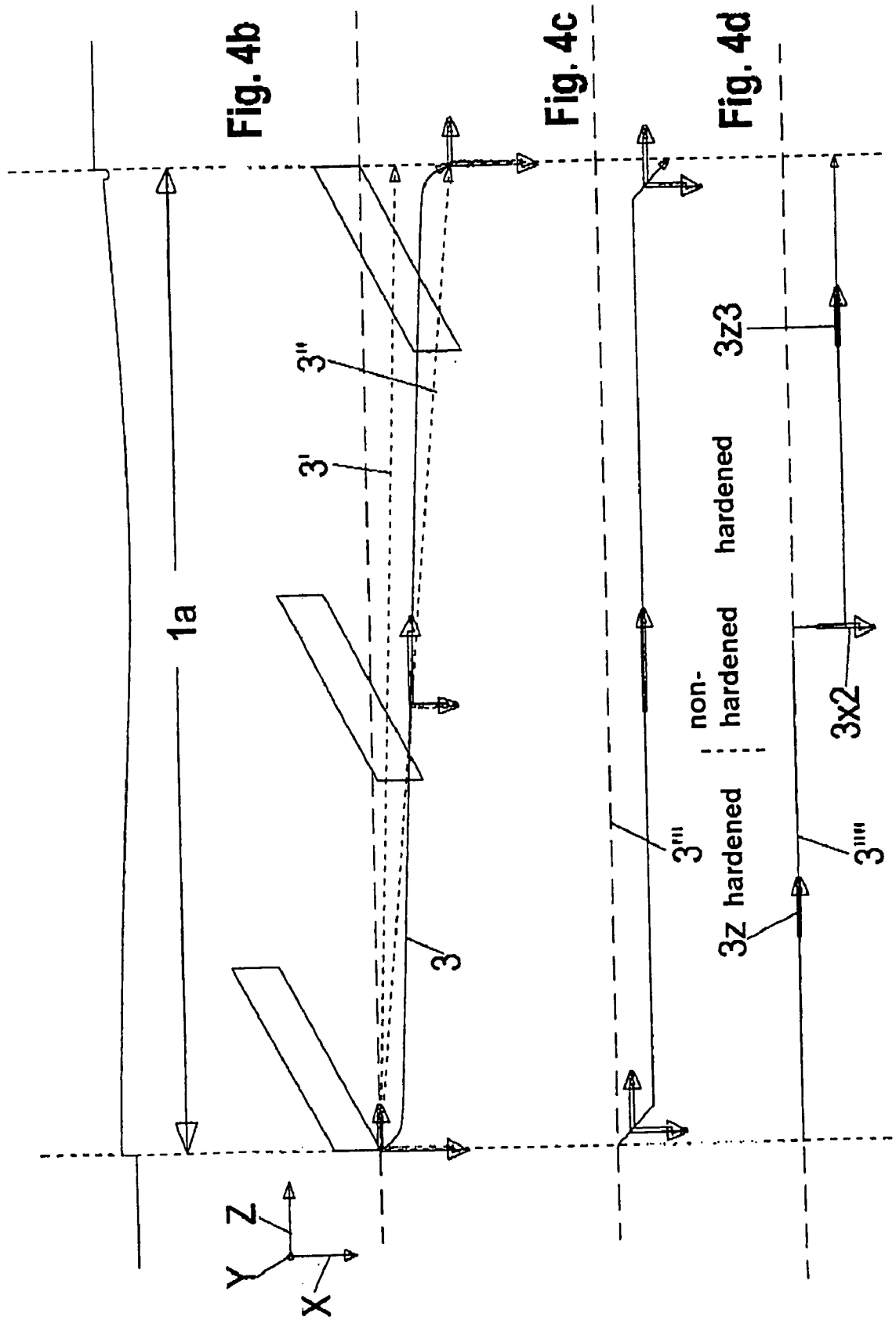

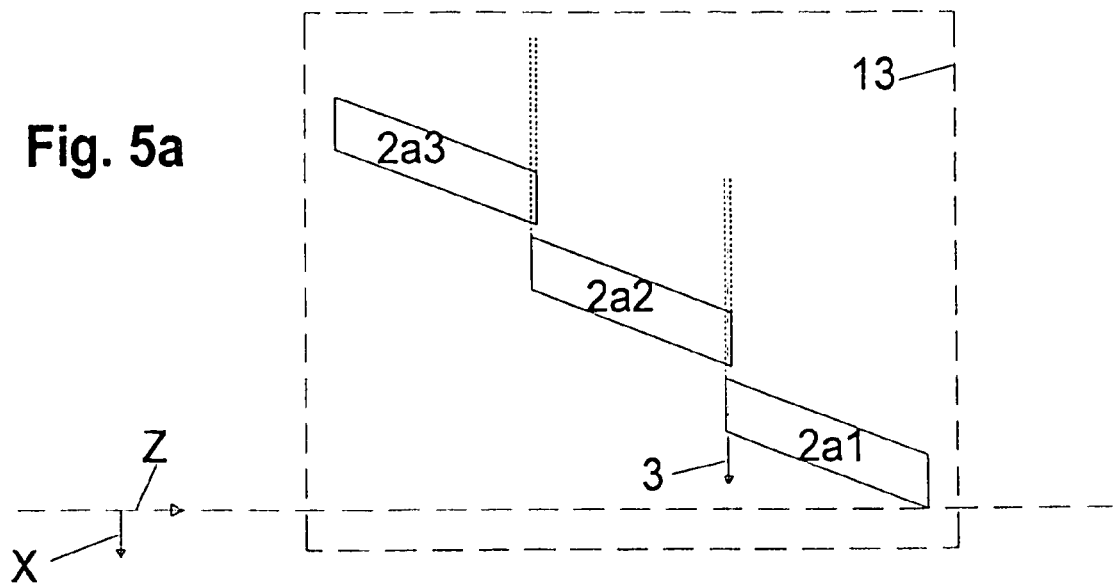
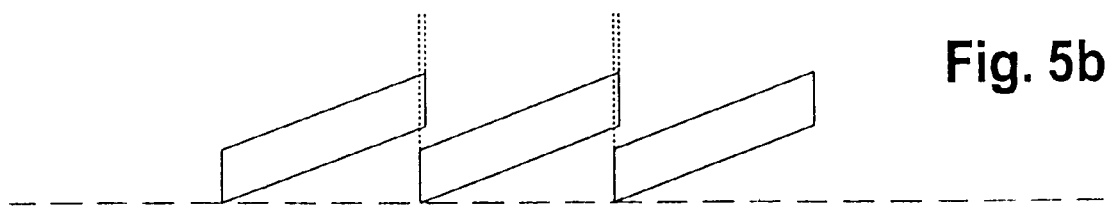
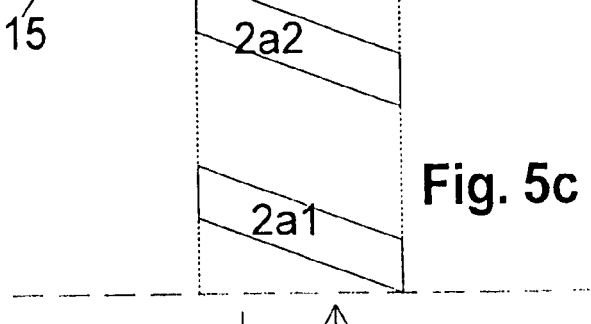
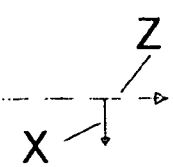

PROCESS FOR TWIST-FREE STEEL CUTTING OF ROTATIONAL SYMMETRICAL SURFACES

CROSS-REFERENCE TO RELATED APPLICATION

This is a National Phase Application entitled "Procedure for Twist-Free Cutting Of Rotational Symmetrical Surfaces" claiming priority to PCT Application No. PCT/EP02/10202 filed 11 Sep. 2002, which claims priority to German Application No. 10144649.7 filed 11 Sep. 2001.

FIELD OF THE INVENTION

The invention concerns the steel cutting of the rotational symmetrical surfaces, in particular the central symmetrical surfaces of a rotating metallic workpiece, in particular made of steel or gray cast iron, likewise in a hardened state too, by means of a cutter or of some cutters with a certain geometry respectively.

BACKGROUND OF THE INVENTION

The steel cutting of the rotation symmetrical surfaces, both in a mild or hardened state, employing cutters with a certain geometry, constitutes the actual state of the art. Thereby the finishing, buffing, honing and the like procedures are partly replaced.

The cutting materials to provide a long enough period of service even for cutting hardened workpieces, are nowadays available in different shapes.

An after hardening machining is as a rule required even if the initial machining takes place with a high level of precision, since after hardening there as a rule partly appear considerable distorsions due to the hardening. Thus a process to restore the exact sizes of the workpiece is a must.

The longitudinal turning always creates a twisted surface, namely regardless of the machined material or whether that is hardened or not respectively.

This surface has regular structures (grooves like prominences) corresponding to a thread shaped structure (twisted) which, by the advance of the tool along the rotating workpiece are producing a screw pitch.

This thing is valid to the same extent for the cylindrical, conical or other differently shaped workpiece surfaces. Thus the surfaces of the workpiece to be machined have for example the shape of a thread or parts of it.

The dependency in accordance with the formula describing the thread depth and the thread shaped structure rugosity respectively, is presented in FIG. 3.

Since the cutting feed-motions, in particular in case of the workpieces hardened for an enhanced surface quality—are as a rule very small, this often leads to a relatively slow machining advance and a low cutting output capacity respectively.

While the relatively low cutting output capacity is an important economic drawback, the twisted surfaces are creating technical problems to the packings arranged on them, in particular whether they are shifting with respect to the surfaces, for example in case of a shaft rotating inside a fixed packing. Such packings may be for example the well-known shaft radial packing washers.

By means of the grooves or the thread shaped barbs respectively, such twisted surface carries cooling fluid, fuel, etc. along the surface, about the packing, from one side to the other in the axial direction, thus that the sealing effect of the packing will be significantly decreased. In particular in case of machines which for example out of hygiene or environment protection reasons have to run without leaking, this thing is a problem worthy of being considered.

Supplementary, because of these grooves or thread shaped prominences, the sealing elements arranged on the twisted surfaces will be often deteriorated in time at their lines or contact surfaces, or at least strongly abrasively stressed. By this wear or deterioration, the sealing effect will be likewise often significantly decreased or annulled before long.

As to the actual steel cutting of the rotating workpieces, considering the above-mentioned problems, there arises the following situation:

Whether on rotating the rotation symmetrical surfaces there is attempted the avoiding of the thread shaped appearance by shifting the tool but radially (transverse motion turning) with respect to the workpiece, due to the lack of the axial motion there is thus obtained a twist-free surface. But in case that the cutter is as broad in the axial direction as the total rotation symmetrical surface to be obtained, there are arising, in particular on machining the hardened surfaces, very great transverse forces, and because of the dynamic instability there is a high vibration tendency. These dynamic instabilities and the vibration respectively, are leading quickly to so great surface irregularities that in this case the surface is likewise too irregular for a perfect sealing.

Whether on broader surfaces to be machined the cutter is supplementary shifting along them, this meaning in the axial direction, there naturally appears again a twisted surface, as long as the cutter is not exactly arranged in parallel to the longitudinal direction. But in case that such a parallelism is obtained, the cutter immediately tends to vibrate.

Therefore, according to the actual state of art, is necessary that the twist thus created, in particular the thread like grooves remaining after turning, be sufficiently decreased or entirely eliminated by means of later expensive supplementary procedures to provide thus a perfect sealing effect.

A possibility to avoid the surface twist (turning grooves), could be the rotary broaching procedure, whereupon the broaching cutter will be shifted in a tangential direction about the rotating workpiece. If the individual cutters of the rotary broaching machine are orientated in parallel with respect to the rotation axis of the workpiece, there arises again here the problem of the great forces acting upon the cutters and thereby both a tendency to dynamic instability and vibration.

On the rotary broaching by means of a disk shaped cutter holder having the cutters on the circumference of the cutter holder, on the oblique arrangement of the straight cutters there supplementary arises the problem of obtaining a workpiece with a convex curved surface instead of an exactly cylindrical one.

Further on, often as a supplementary procedure, there is employed the surface buffing. This means that as a rule the workpiece has to be mounted on another type of machine. This means that the cost price per workpiece will soar up because of an extended operating process involving the employing of supplementary machines, leading thereby to a considerable worsened economic efficiency. Further on, according to the actual state of art, on the final machining of the workpiece, if possible, the buffing should be avoided since this is as a rule carried out as a damp procedure and thereby, because of the buffing slime, there arise supplementary environment and salubrity problems, thus worsening the economic efficiency.

Furthermore, even on buffing there are created twisted structures which as a result of the buffing procedure firstly appear on the buffing wheel, to form in the end on the workpiece. On finishing too, whereupon a finishing band or a finishing element is brought into contact with the workpiece, because of the vibrations and the finishing tool supplementary longitudinal shift with respect to the workpiece respectively, there appear twisted surface structures.

Further on, from DE 199 63 897 there is known the workpiece machining by means of an obliquely arranged cutter with respect to the rotation axis of the workpiece, in that this is tangentially shifted along the workpiece. By controlling the lead and/or the oblique arrangement of the cutter there may be minimized both the pitch and the depth of the twist like grooves, while on machining the hardened workpieces the cutting output capacity of the cutter may be optimized.

A drawback of this procedure consists in having the axial length of the surfaces to be machined limited by the possible length of the small plates in the axial direction.

SUMMARY OF THE INVENTION

Therefore the object of the present invention is:

to limit less or not at all respectively the axial length and the added material of the surfaces to be machined and/or to decrease the operation period on machining according to this procedure and/or to increase the period of service of the cutter and/or to further obtain the twist-free effect.

This object is attained by features of the claim 1. Advantageous embodiments are set forth in the appendant claims.

By the axial lead of the cutter holder there may be influenced the axial length size of the workpiece surface which may be machined in one or several passes respectively, with a cutter or a cutter holder which may have several cutters.

Since in this case the cutter—which may be straight or curved—is not arranged with a corner orientated towards the center of rotation, but fixed obliquely to the external circumference of the surface to be machined, there may be obtained a twist reduction or elimination respectively.

The relationship between the axial and tangential lead components, which in case of a linear feed motion is a constant ratio, influences here the remanent twist which may appear, as well as the cutter shape, in particular whether a curved cutter is not arranged in the tangential plane it will be shifted in with respect to the workpiece to be machined, but is transversely arranged with respect to this tangential plane—which is defined by the direction of the feed motion and the cutter ridge projection as seen in the direction of the feed motion.

In that the tangential and axial motion may be independently controlled one with respect to the other, on the one hand there may be controlled the wear along the longitudinal extent of the cutter, and in particular constantly distributed along this longitudinal extent, and on the other hand—depending on the end of the optimisation—the twist emerging on the machined rotation symmetrical surface may be likewise modified as to its longitudinal position with respect to the workpiece.

With this procedure according to the invention, there may be machined not only rotation symmetrical surfaces with a generating line (as for example the cone), but rotation symmetrical surfaces without a generating line too, therefore rotation symmetrical surfaces having a certain shape. This thing is advantageous in particular due to the fact that the rotation symmetrical surfaces having a certain shape too, therefore concave or convex surface forms, may be machined even by means of a straight cutter:

To this end—in case of a straight cutter—besides the axial and tangential motion, during the contact between the workpiece and the cutter there shall be added a radial motion, which has likewise to be independently controlled with respect to the other two components to obtain thus the desired shape. In case of a properly molding of the cutter in a transverse plane with respect to its feed motion, the surface form radial component may be incorporated in the cutter shape instead of the otherwise necessary radial positioning (the Y direction).

In the ideal situation, the tool may be overturned—with respect to the workpiece—around at least one of the transverse directions (the X or Y direction) thus that in each machining point the cutter feed plane may be always tangentially guided to the respective curve of the workpiece. Together with a feed motion axial component (the Z direction) this leads per total to a screw motion.

In case that the axial extents intended for the workpiece surfaces cannot be realized with the available axial extents for the small plates, observing the desired twist minimization and a minimum period of service for the cutter respectively, the workpiece surface axial length machining may be divided in successive or simultaneous machinings, with different cutters.

The cutters may be arranged on one and the same cutter holder base body displaced one with respect to the other in the longitudinal direction corresponding to the planned employing succession, in particular slightly overlapping each other in the transverse direction where there is no need for a supplementary transverse displacement with respect to the longitudinal direction. The simultaneously or successively employed cutters, either being arranged on one and the same base body or on different base bodies, may be associated with different machining stages, for example roughing and finishing.

Out of reasons related to the possibility of having the cutter holder controlled in the longitudinal direction there is sufficient an arrangement of the different cutters with an exclusive transverse direction displacement, thus that after operating the first cutter and before operating the next cutter, the entire cutter holder be properly positioned with respect to the workpiece in the longitudinal direction.

There is likewise possible to have the different cutters arranged on the circumference of a circular base body of the cutter holder, in particular a disk shaped one, whereupon during the operation of the cutters the circular feed of the cutter holder is preferably stopped while the cutter holder unit is exclusively shifting into a momentary linear feed motion with respect to the workpiece.

In that the cutter wear uniformity may be controlled along its longitudinal extent for optimization purposes, there results for example a supplementary optimization of the cutter's period of service.

Further on, resorting to the procedure according to the invention, on the workpiece there likewise may be machined a surface inside which—for example in the longitudinal direction—there are one or more passes from hardened to non-hardened metal or inversely. Such passing areas have posed up until now great machining problems, since both for hardened or non-hardened metals there were known properly cutter materials, but none cutter material could machine both without wearing out much too fast.

But resorting to the procedure according to the invention there is possible, by employing CBN (cubical centered boron-nitrite) and/or hard metal to cut both hardened or non-hardened materials, as well as the passing areas between two such different areas, whereupon the wear of the cutters and the small plates respectively remain within the normal limits. The reason may be noticed from the fact that as long as at least a slight tangential component is always maintained on the feed motion, a given point of the cutter always operates only for a very short period of time upon the workpiece.

Another advantage of the procedure according to the invention consists in the possibility of obtaining a very good surface quality, not only as to the rugosity but as to the roundness of the machined surfaces too.

BRIEF DESCRIPTION OF THE DRAWINGS

Several embodiments in accordance with the invention are described in greater detail by way of example hereinafter with reference to the figures in which:

FIG. 2 is a view of the situation from FIG. 1, transverse with respect to the rotation axis 10 and with respect to the feed motion 3, FIG. 4, 4a show the perspective views of another machining situation, FIG. 4b shows a situation according to FIG. 4a in an upper radial view, FIG. 4c shows one more situation in an upper radial view, FIG. 4d shows another situation in an upper radial view, FIG. 5 shows more cutter endowed cutter holders, each seen in an upper radial view.

BRIEF DESCRIPTION OF THE PREFERRED EMBODIMENTS

Figure 3:
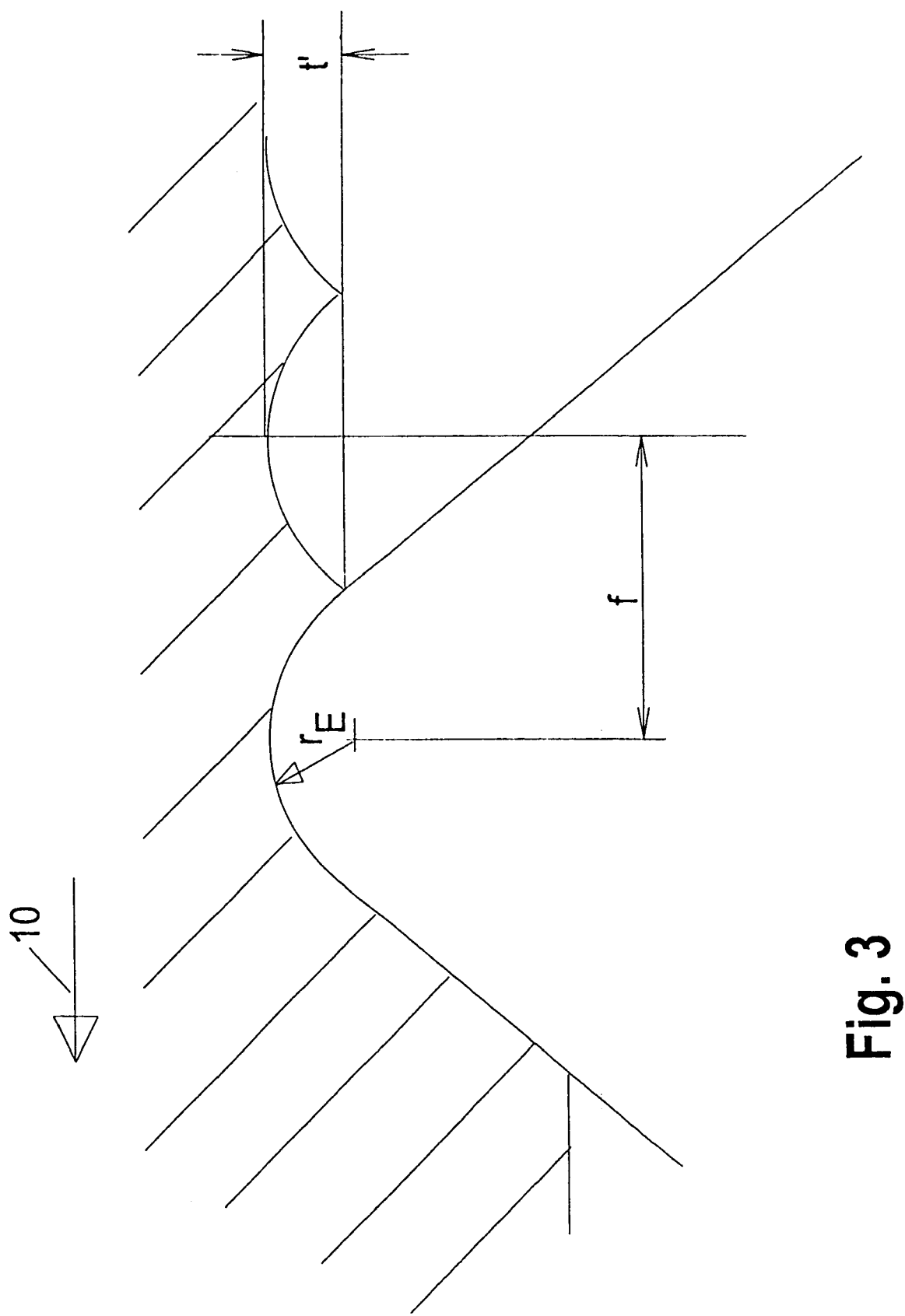
FIG. 3 is a view of the situation in case of the longitudinal turning, on purpose to present the actual state of the art, as well as solutions according to the invention.

Firstly, in FIG. 3 there is represented how for example on longitudinal turning, by having the cutter shifted in the direction of the rotation axis and by its vertex radius $r_E$, there results a thread shaped surface:

On a constant lead f, expressed in mm/workpiece rotation, there appears a helically shaped groove 5 whose pitch in the direction of the rotation axis 10 is constant at a constant lead f. The depth t' of this groove clearly depends here on the size of the vertex radius $r_E$ of the resulting cut: the greater this vertex radius $r_E$ is, the more flattened the groove flanks are, and thereby the smaller the depth t' will be. The dependency in accordance with the formula shows:

$$t = \frac{f^2}{8 \cdot r_E}$$

Only by having as a rule at least one of the cutter ridges, in particular that of the secondary cutting edge which is producing the cutting corner, positioned in an angle as small as possible, preferably in parallel to the direction of the rotation axis 10, there is usually possible to minimize the depth t', since the lead f, out of preset tact time reasons, cannot be decreased as much as desired in production.

Figure 1:
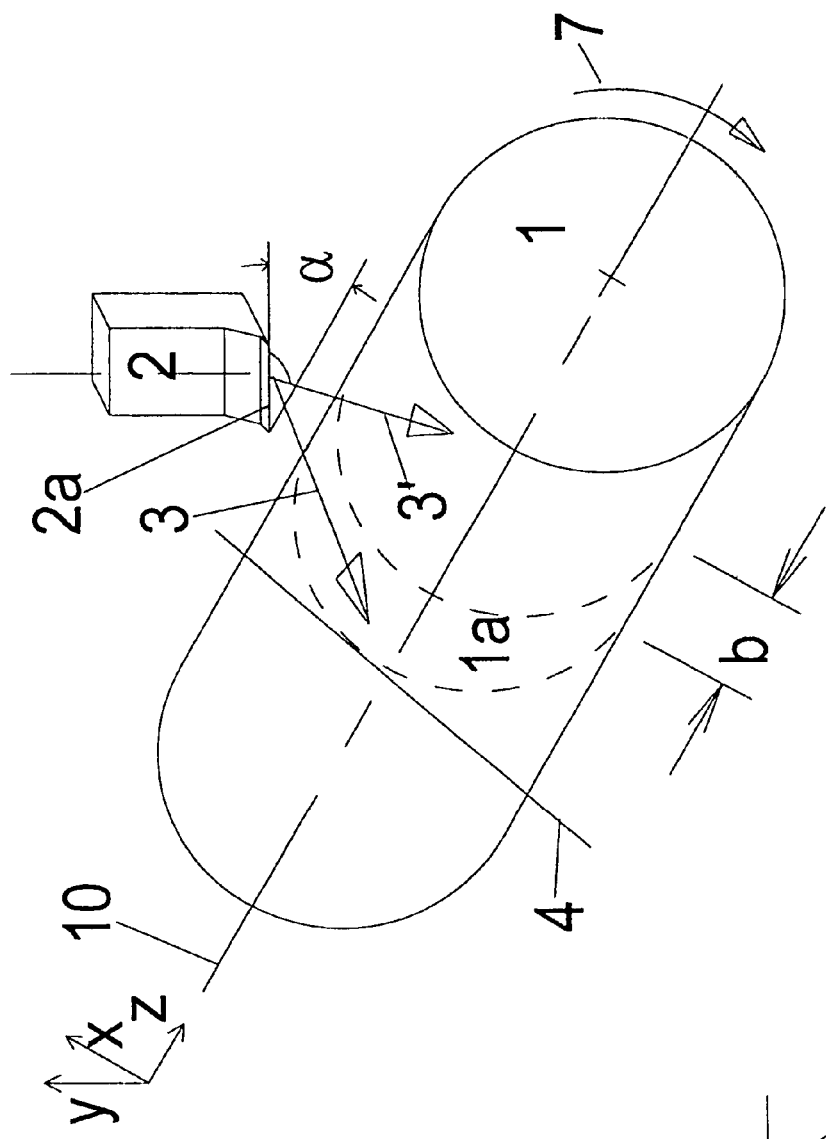
FIG. 1 is a perspective view of the machining situation.

FIGS. 1 and 2 show the situation on the tangential turning:

As shown in FIG. 1, the workpiece 1 with the rotation symmetrical surface 1a to be machined, is rotating around the rotation axis 10, in case of lathes or rotary broaching machines usually designated as the Z direction, on which there are usually set each of the X and Y directions.

In the Z direction, the rotation symmetrical surface 1a to be machined has a width b, and as a rule on a later use it has to serve as a locating surface for the shaft radial packing washer or for another similar element.

The cutter holder 2 is guided along the workpiece, with its cutter 2a obliquely orientated with respect to the Z direction, in a direction of the feed motion (3) which is parallel to one of the tangential surfaces to the rotation symmetrical surface 1a, transverse with respect to the direction of the rotation axis 10, thus that the individual cutting areas are successively coming in contact with different areas of the rotation symmetrical surface 1a in the Z direction, whereupon the extent of the cutter 2a in the direction of the rotation axis 10, therefore in the direction 10, is equal or greater than the width b of the surface to be machined. The direction of the feed motion 3 of the cutter holder may be here in a perpendicular plane to the workpiece rotation axis 10, therefore in a radial plane of the workpiece or in an oblique plane with respect to the workpiece rotation axis 10 (the direction of the feed motion 3').

Figure 1A:
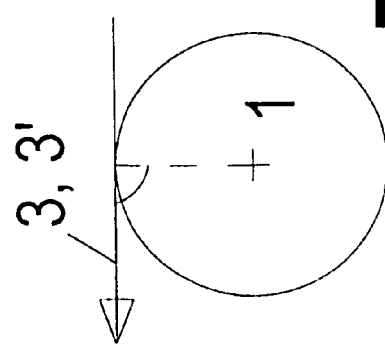

Seen in the direction of the workpiece rotation axis 10, the direction of the feed motions 3 and 3' respectively, always represents a tangent to the theoretical diameter of the rotation symmetrical surface to be machined (see FIG. 1a).

During machining, the workpiece 1 rotates in a rotation direction 7 thus that in the contact area between the cutter 2a and the surface 1a to be machined, the surface of the workpiece 1 shifts towards the cutter 2a.

The upper view in the Y direction from FIG. 2 shows the oblique positioning angle α of the cutter 2a with respect to the rotation axis 10 of the workpiece 1, and the feed motion 3 of the cutter 2a, which in the upper view takes place in a right angle with respect to this rotation axis.

Because of the cutting motion taking place on machining from the right corner towards the left one of the cutter 2a from FIG. 2, there results the thread like surface structure concordant with FIG. 2. This surface structure takes shape by a thread like groove 5 whose individual windings are directly contiguous to each other in the longitudinal direction of the workpiece, and form between them a thread like barb 6.

In this representation, the size of the grooves 5 is greatly exaggerated in comparison with the real situation. The depth of the groove 5 will be characterized as the depth of the twist t, while the distance between two windings of the barb 6 and of the groove 5 respectively, as measured in the direction of the rotation axis 10, will be characterized as the twist pitch s.

The cutter 2a may be shifted with respect to the workpiece 1 along a transverse feed motion 3' with respect to the rotation axis 10 too, and in particular perpendicular to the cutter 2a, whereupon there is then necessary a somewhat smaller width of the cutter 2a.

The pitch s of the twist depends on the lead f providing the advance in the direction of the feed motion 3 measured in millimeters per workpiece rotation, and on the oblique positioning angle α, as follows:

$$s = \frac{f}{\tan \alpha}$$

The depth t of the twist depends on the workpiece radius r as measured up to the depths between the barbs 6 (the core diameter) from the surface to be machined 1a, and on the lead f as follows:

$$t = -r + \sqrt{r^2 + \frac{f^2}{4}}$$

Because of the representation from FIG. 2 it becomes obvious that on reaching a depth of the twist t=0 or at least t<1 µm, in particular t<0.4 µm, in particular t<0.2 µm, the size of the pitch s of the twist does not have any importance anymore.

Thus there is firstly intended the maintaining of a lead f as small as possible, in particular so small that the depth t of the twist become significantly smaller, in particular at least with the factor 3, or better with the factor 5, smaller than the depth of the rugosity $R_Z$ of the surface thus obtained. The depth of the rugosity $R_Z$ is usually within the range between 1,5 µm and 6 µm.

The solution according to the invention from FIG. 4 shows that by means of a cutter, in particular straight, obliquely arranged, with the described method there may be realized rotation symmetrical surfaces 1a without a generating line too, but a generator one, as the concave generator and the surface 1a respectively of the workpiece 1 according to FIG. 4.

For this, the feed motion 3 has to comprise a motion component 3Y, radially orientated towards the rotation axis 10.

As the upper radial view, seen in the Y direction, of FIG. 4 shows, on the machining situation from FIG. 4, during machining the surface 1a, the tangential component 3x may always remain in a constant relationship, fixed with respect to the axial component 3z, thereby resulting in the upper view from FIG. 4b a linear feed motion 3', 3".

But this relationship 3y/3z will be preferably modified during the axial machining advance, thus that in the upper view there will not result anymore a linear feed motion. By this independent control of the tangential and axial component there may be controlled as independently as possible one with respect to the other the tangential forces as well as the radial forces acting upon the workpiece too. Thereby there may be optimized for example the period of service of the cutter 2a and/or the surface quality and/or the twist minimization.

A typical case (FIG. 4b) thus shows that in the first moments of starting employing the cutter, the tangential component 3x is relatively great in order to minimize the load over the front part of the cutter 2a.

In the median area of the axial extent of the surface 1a, the axial component 3z of the feed motion is visibly increased, as much as the preset objectives allow—either considering the twist minimization or the cutter wear in the median area of the cutter 2a.

When the machining is about to be completed, therefore near the end of the axial extent of the surface 1a, for example the tangential component 3x will be again increased with respect to the axial component 3z to have thus this time maintain a small wear at the other end of the cutter 2a.

FIG. 4c shows too a machining process whereupon, in the beginning, the feed motion 3, 3' has firstly both an axial component 3z and a tangential component 3x too, then in a relatively great median area there will be carried out only an axial shift (3z), and then but near the completion of the feed motion being added again a tangential component 3x. This fact is typical for the situation in which a very long workpiece surface 1a has to be machined in the axial direction with a single cutter 2a.

FIG. 4d shows somewhat the contrary situation:

On this feed motion 3"", both in the beginning and near the completion of the feed motion, over quite great areas, the cutter holder will be shifted exclusively axially (3z1, 3z3). Only in the median area there takes place either an exclusively or inclusively cutter holder shift in the tangential direction (3×2). This would be the typical process for the situation in which in that median area is only non-hardened material while the front and end areas are hardened and the cutter 2a is either made of CBN or hard metal, reason why in the non-hardened area a point of the cutter 2a has to operate within a time interval as short as possible.

Supplementary—depending on the surface to be realized—there is necessary the overlapping of a radial component y, which shall likewise be separatedly controlled, among others according to the variable shifting speed in the axial direction 3z.

In order to make possible a cutter shifting plane positioning to the tangential plane with respect to each of the machining points, first and foremost in the convex areas of the surface to be machined, the cutter 2a will be preferably overturned around an overturning axis 14 which may comprise components of the X, Y and/or Z direction, and which is in particular parallel to the X direction, as shown in FIG. 4a.

The FIG. 5 show again—in an upper radial view—the machining of a surface with more cutters 2a1, 2a2 . . .

According to FIG. 5a these are the cutters 2a1, 2a2 . . . operating successively in time, a must for example when the desired optimization can no longer be done by means of a single cutter.

In FIG. 5a these cutters 2a1, 2a2 . . . are on the one hand displaced one with respect to the other in the tangential direction X, thus that the next cutter operates when the previous cutter ceased operating. Supplementary, there is here a displacement in the axial direction (the Z direction), whereupon in this direction the cutters 2a1, 2a2 . . . may still slightly overlap each other.

The cutters 2a1, 2a2 . . . are for example fixed to a common base body of the cutter holder 13, which preferably at least in the X and Z direction—for machining the non-cylindrical surfaces—and in the Y direction, may be independently controlled.

Instead, on the solution according to FIG. 5b—which is again an upper radial view, therefore seen in the Y direction—the cutters 2a1, 2a2 . . . are indeed displaced one with respect to the other in the axial direction Z, preferably still slightly overlapping in the Z direction. But instead in the tangential direction, the X direction, there is no displacement or but a minimum one, to prevent the simultaneous initial contact of all the cutters 2a1, 2a2 . . . with the surface 1a of the workpiece. A cutter displacement in the tangential direction X may be avoided whether the oblique positioning of the cutters 2a1, 2a2 . . . related to their longitudinal extent is so great that the entire displacement of a cutter in the X direction is greater than the next cutter cross-section in this direction, in its front area.

The advantage of this solution consists in that a very great surface 1a may be completely machined by employing but a small feed motion, therefore very rapidly, while on a supplementary succession in the X direction of the cutters 2a1, 2a2 . . . there is necessary a significantly greater forward motion to operate successively in time all these cutters.

Instead, in FIG. 5c there are arranged more cutters 2a1, 2a2 . . . —again in an upper radial view, therefore seen in the Y direction, in the same position Z, therefore in a row in the tangential direction X, in particular arranged in parallel one with respect to the other, having therefore the same oblique positioning angle a. These cutters may be fixed to a cutter holder base body movable in two or even three spatial directions X, Z, and Y if necessary, or may be likewise displacedly arranged on the circumference of a disk shaped cutter holder base body whose rotation axis is preferably set in parallel to the Z direction, FIG. 5 showing at least one portion of this circumference.

In order to successively employ the individual cutters for machining different axial areas of the surface 1a, after a cutter ceases operating, for example 2a1, and before the next cutter 2a2 starts operating, this base body of the cutter holder 13' will be overturned with a proper angle around the overturning axis 15 of the base body of the cutter holder 13', and supplementary displaced in the axial direction.

During the workpiece machining there is interrupted the overturning shifting of the disk shaped base body of the cutter holder 13', while the cutter holder base body is shifting exclusively linearly in the X, Z and if necessary Y direction.

As a matter of course, these cutters from FIG. 5c arranged on the same axial position may be successively employed too on the same surface without an axial motion, what is in particular useful whether the cutters are carrying out successively machining stages, for example roughing, finishing and high finishing.

Here, by the example of an individual cutter 2a3, there is shown that such a cutter—seen in the upper radial view of FIG. 5c—shall not be necessarily straight, but curvedly shaped too, for example concave but convex too.

Supplementary or instead, such a cutter may likewise have—as seen in the direction of the feed motion, therefore according to FIG. 5c in the tangential direction X—a cutting ridge k which is not curved in the feed plane—formed by the feed motion 3 and the main direction of the cutter 2a—but towards this feed plane 16.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

LIST OF REFERENCES 1 workpiece
1a rotation symmetrical surface
2 cutter holder
2a cutter
3, 3' feed motion
4 tangent
5 groove
6 barb
7 rotation direction
8 working line
10 the Z direction, the rotation axis
11 the X direction
12 the Y direction
13, 13' cutter holder base body
14 overturning axis
15 overturning axis
16 feed plane
f lead
$\alpha$ oblique positioning angle
r the workpiece radius
s the twist pitch
t the twist depth
b the width of the surface 1a
$R_z$ the depth of the rugosity
k cutting ridge
$r_E$ the vertex radius

What is claimed is:

1. A process for steel cutting the rotational symmetrical surfaces of a rotating workpiece, said process comprising the steps of:
   shifting at least one cutter, obliquely arranged with respect to a rotational axis of the workpiece, in a feed motion along the rotating workpiece while in contact with the rotating workpiece, said feed motion having both an axial motion, and an independent tangential motion transverse with respect to the direction of the axis and taking place in a tangential plane of the rotation symmetrical surface wherein the tangential motion and the axial motion of the feed motion are independently controlled with respect to each other; and
   choosing the machining parameters, including the feed taking place in the direction of the feed motion and the oblique positioning $\alpha$ of the cutter with respect to the longitudinal direction (Z) of the rotation axis, so that the twist appearing on the machined surface becomes minimal with respect to the twist pitch (s) and/or the twist depth (t).

2. A process according to claim 1 wherein the cutter is in the tangential plane that the linear feed motion takes place in.

3. A process according to claim 1 wherein the machining parameters are the relationship and the modification of the relationship between the tangential motion and the axial motion respectively and are controlled in such a way as to employ the entire extent of the cutter, to achieve a constant wear of the cutter over its entire extent and to maximize the amount of operations having to be carried out by the cutter.

4. A process according to claim 1 wherein the cutter is a straight cutter.

5. A process according to claim 1 wherein the rotational symmetrical surface is a cylinder or a cone, and the linear feed motion takes place in the tangential plane of the cylinder or in the tangential plane of the cone.

6. A process according to claim 1 wherein in longitudinal section, the rotational symmetrical surface is a concavely or convexly curved surface, the cutter is a straight cutter, and the feed motion in which the cutter is shifted along the rotating workpiece while being in contact with the rotating workpiece has a radial motion additional to the tangential motion and the axial motion.

7. A process according to claim 1 wherein the oblique positioning $\alpha$ of the cutter with respect to the rotation axis is between 0° and 90°.

8. A process according to 1 wherein the feed is chosen with respect to the oblique positioning $\alpha$ of the cutter, the diameter of the rotational symmetrical surface to be machined and the rate of cutting such that the grooves which appear on the surface of the workpiece during the machining do substantially not exhibit features of a thread in regard to the twist pitch (s) and the twist depth (t).

9. A process according to claim 1 wherein on employing more obliquely contiguous cutters the cutters are arranged axially displaced one with respect to the other, overlapped on the same cutter holder base body.

10. A process according to claim 1 wherein on employing more obliquely contiguous cutters, the cutters are arranged transversely displaced one with respect to the other in the circumference of a disk shaped holder base body.

11. A process according to claim 1 wherein the feed motion is a linear motion.

12. A process according to claim 1 wherein on the same surface of the workpiece, there are successively employed roughing tools and shear tools.

13. A process according to claim 1 wherein with one and the same cutter made of cubical centered boron-nitrite and/or hard metal, there may be machined both hardened or non-hardened workpieces and hardened and non-hardened areas on one and the same workpiece, inclusive of a pass from a hardened area to a non-hardened one and inversely.

14. A process according to claim 1 wherein employing, more obliquely contiguous cutters arranged axially displaced one with respect to the other on a circumference of a disk shaped cutter holder base body.

15. A process according to claim 1 wherein the oblique positioning $\alpha$ of the cutter with respect to the rotation axis is between 20° and 50°.

* * * * *